United States Patent Office 3,579,569
Patented May 18, 1971

3,579,569
PREPARATION OF VINYL ACETATE
Stewart R. Montgomery, Silver Spring, and Melville E. Hillmann, Rockville, Md., assignors to W. R. Grace & Co., New York, N.Y.
No Drawing. Filed Oct. 6, 1967, Ser. No. 673,297
Int. Cl. C07c 67/04
U.S. Cl. 260—497　　　　　　　　　　　　　　　4 Claims

ABSTRACT OF THE DISCLOSURE

Vinyl acetate is produced by reacting ethylene and acetic acid in the vapor phase in the presence of a novel catalyst. The catalyst is solid titanium dioxide which has been treated with an aqueous solution of a basic material and with a solution of a soluble salt of a Group VIII noble metal. The Group VIII noble metal salt which deposited on the surface of the titanium dioxide is subsequently reduced to the metallic state with hydrogen.

---

This application is a continuation-in-part of our Ser. No. 609,298, filed Jan. 16, 1967, and now abandoned.

This invention is in the field of catalyst production and catalyst utilization, especially preparing and utilizing catalysts for producing vinyl acetate by reacting gaseous mixtures of ethylene, acetic acid, and oxygen in the presence of catalysts.

Other catalysts which are suitable for preparing vinyl acetate from gaseous mixtures of ethylene and acetic acid in the presence of oxygen are disclosed in Canadian Pat. 754,179 and French Pat. 1,407,526.

In summary, this invention is directed to a catalyst composition for catalyzing the conversion of vaporous mixtures of ethylene, oxygen, and acetic acid to vinyl acetate, said composition comprising a Group VIII noble metal selected from the group consisting of ruthenium, rhodium, palladium, osmium, iridium, and platinum deposited on a support which has been treated with a basic material selected from the group consisting of alkali metal hydroxides, alkali metal alkoxides, alkali metal oxides, and alkali metal salts of fatty acids having from one to six carbon atoms, said support being selected from the group consisting of titainum dioxide and alumina-titanium dioxide.

In preferred embodiments of the invention set forth in the above summary:

(1) The basic material is potassium hydroxide;
(2) The support is titanium dioxide and the noble metal is palladium; and
(3) About 0.5–8% by weight of palladium is deposited on the support.

In another preferred embodiment (Embodiment A) this invention is directed to a method for preparing a catalyst, said method comprising:

(a) Treating particulate titanium dioxide with a basic material selected from the group consisting of alkali metal hydroxides, alkali metal oxides, alkali metal alkoxides, and alkali metal salts of fatty acids having from one to six carbon atoms;
(b) Pelletizing the basic material-treated titanium dioxide;
(c) Calcining the pellets;
(d) Impregnating the calcined pellets with an aqueous solution of a palladium salt;
(e) Subjecting the impregnated pellets to hydrogen reduction to substantially reduce the palladium salt to palladium metal.

In a preferred embodiment of Embodiment A the palladium salt is palladium nitrate.

In another embodiment (Embodiment B) this invention is directed to a method for preparing a catalyst, said method comprising:

(a) Forming pellets from titanium dioxide and calcining the pellets;
(b) Impregnating the calcined titanium dioxide pellets with an aqueous solution of a palladium salt;
(c) Treating the palladium salt impregnated pellets with basic material, said basic material being selected from the group consisting of alkali metal hydroxides, alkali metal alkoxides, alkali metal oxides, and alkali metal salts of fatty acids having from one to six carbon atoms;
(d) Subjecting the impregnated pellets to hydrogen reduction to substantially reduce the palladium salt to palladium metal.

In another preferred embodiment (Embodiment C) this invention is directed to a method for preparing vinyl acetate, said method comprising:

(a) Passing a gaseous feedstuff mixture of oxygen ethylene, and acetic acid over a catalyst in a reaction zone, said catalyst comprising palladium deposited on a titanium dioxide support which has been treated with a basic material selected from the group consisting of alkali metal hydroxides, alkali metal alkoxides, alkali metal oxides, and alkali metal salts of carboxylic acids having from one to six carbon atoms, at a temperature of about 90–200° C. and at a pressure of about 0–150 pounds per square inch gauge;
(b) Removing a reaction mixture, said reaction mixture consisting essentially of reaction product and unreacted gaseous feedstuff from the reaction zone;
(c) Recovering vinyl acetate from the reaction mixture exit the reaction zone.

In preferred embodiments of the method set forth in Embodiment C, supra:

(1) The mole ratio of ethylene to acetic acid in the gaseous feedstuff mixture is about 10:1 to about 1:10 and oxygen is present in said feedstuff mixture in amounts ranging from about 0.5 to 20% by volume of the total gaseous feedstuff mixture;
(2) The gaseous feedstuff mixture is passed over the catalyst at a rate to provide about 400–2000 liters of gaseous mixture per liter of catalyst per hour; and
(3) The reaction mixture is recycled to the reaction zone after recovering vinyl acetate from said mixture.

In another preferred embodiment (Embodiment D) this invention is directed to a composition for catalyzing the conversion of vaporous mixtures of ethylene, oxygen, and acetic acid to vinyl acetate, said composition comprising a Group VIII noble metal deposited on a titanium dioxide support which has been treated with a basic material selected from the group consisting of alkali metal hydroxides, alkali metal oxides, alkali metal alkoxides, and alkali metal salts of fatty acids having from one to six carbon atoms.

It is generally known that ethylene and acetic acid may be reacted in either the liquid or vapor phase in the presence of a suitable catalyst and oxygen to produce vinyl acetate. From the standpoint of commercial production, the vapor phase reaction route possesses several processing advantages over the liquid phase methods. However, it has been found that heretofore known catalyst systems have produced substantially lower yields of vinyl acetate in the vapor phase than have been obtained in the corresponding liquid phase reaction methods.

It is therefore an object of the present invention to provide an improved method for producing vinyl acetate by the vapor phase reaction of ethylene and acetic acid.

It is another object of the present invention to provide a novel catalyst system which produces superior yields of vinyl acetate by the vapor phase reaction of ethylene and acetic acid in the presence of oxygen.

It is still another object to provide a vapor phase vinyl acetate catalyst which remains catalytically efficient for extended periods of use.

These and still further objects will become readily apparent to those skilled in the art from the following disclosure and specific examples.

Broadly, the present invention contemplates a novel catalyst which comprises a low surface area, basic material-treated titanium dioxide support which can also be a basic material treated titanium dioxide-alumina (or alumina-titanium dioxide) support; that is, a basic material treated titanium dioxide-alumina support which incorporates from about 0.2% to about 8% (preferably about 0.5–4%) by weight of a Group VIII noble metal, e.g., palladium, platinum, ruthenium, iridium, rhodium, and osmium.

The term "basic material" as used herein means a material selected from the group consisting of alkali metal hydroxides, alkali metal oxides, alkali metal alkoxides, and alkali metal salts of fatty acids having from one to six carbon atoms. Examples of these compounds include: lithium hydroxide, potassium oxide, sodium ethoxide, and sodium acetate.

The term "basic material-treated titanium dioxide support" means a titanium dioxide support which has been treated with a basic material as defined supra.

The term "basic material treated titanium dioxide-alumina support" means a titanium dioxide-alumina (or an alumina-titanium dioxide) support which has been treated with a basic material, the term basic material having the meaning given supra.

The term "gaseous mixtures of ethylene, acetic acid and oxygen" means mixtures of gaseous ethylene, acetic acid vapor, and oxygen gas. Such mixtures can contain an inert gas (e.g., nitrogen or helium); such mixtures can also contain an inert vapor (e.g., steam).

The term "%" or "percent" means parts per hundred. Unless otherwise specified where used, "%" or "percent" means parts per hundred by weight.

The term "titanium dioxide-alumina (or alumina-titanium dioxide) support" means a catalyst support consisting essentially of about 15–25 parts by weight titanium dioxide and about 75–85 parts by weight alumina, said alumina having a surface area of 100 m.²/g. The titania and alumina being mixed together to form a slurry which is dried and calcined.

More specifically, our invention comprises a solid catalyst system, which is useful for catalyzing the vapor phase reaction of ethylene, oxygen, and acetic acid to form vinyl acetate, which is prepared by the following steps:

(1) Particulate titanium dioxide is reacted with an excess of basic material, preferably potassium hydroxide.

(2) The basic material-treated titanium dioxide is then pelletized and calcined at a temperature of from about 300 to about 500° C. for a period of at least one hour.

(3) The calcined $TiO_2$ pellets are then impregnated with a methanol-water solution (40–60 parts by volume methanol, plus 60–40 parts by volume water) of a soluble salt of a Group VIII noble metal preferably palladium nitrate.

(4) The Group VIII noble metal salt impregnated pellets are then dried and subjected to hydrogen reduction for a sufficient time to reduce the noble metal salt to metal.

The above catalyst composition, when placed in reactive contact with mixed vapors of ethylene oxygen and acetic acid at a temperature of from about 90 to about 200° C. and pressures ranging from about one atmosphere absolute to 150 pounds per square inch gauge, was found to be capable of continuously producing substantial yields of vinyl acetate for extended periods.

The titanium dioxide initially used to form the present catalyst possesses a particle size of from about 50 to about 150 microns and is conveniently obtained from commercial sources. This particulate titanium dioxide is reacted with an aqueous solution of a basic material, said solution being added at a rate to provide from about 0.001 to about 0.3 mole of basic material per 80 g. of catalyst support used. The preferred basic material is potassium hydroxide, although strong bases such as sodium hydroxide, lithium hydroxide, and other basic alkali metal compounds such as carbonates, alkoxides, phosphates, and alkali metal salts of $C_1$–$C_6$ fatty acids can equally well be used. The basic material treatment is conducted at a temperature of from about 15–50° C. and is complete in a period of from about 2 to about 18 hours.

The basic material treated titanium dioxide obtained above is pelletized into pellets which possess a preferred size of from about 4 to about 10 mesh. However, it should be noted that the ultimate pellet size is not particularly critical to the practice of the present invention, but any size which is conveniently handled by conventional catalytic apparatus may be adapted. The formed pellets are calcined at elevated temperatures (ca. 450–500° C.) to obtain a dense, hard, physically strong pellet. This calcining step can be conducted using conventional apparatus.

The calcined pellets are preferably impregnated with a methanol-water solution of a Group VIII noble metal salt which will impregnate the pellets with about 0.2–8% and preferably from about 3.5–4.5% metal ion. This is conveniently done by adjusting the concentration of the metal salt and aqueous solution to a level of from about 0.1–3.5 moles metal salt per liter of solution. Preferably the Group VIII metal salt utilized is in the form of a nitrate; however, other anions such as acetate, sulfate, and complexes such as palladium(II) tetrammine nitrate and the like can be used. The impregnated pellets are preferably dried at a temperature of from ambient to about 140° C. and subsequently subjected to hydrogen reduction using hydrogen (or a mixture of hydrogen and an inert gas, e.g., nitrogen, helium, argon, and the like, such mixtures containing at least about 5 mole percent hydrogen) at a pressure generally varying from about 300 mm. Hg absolute to about 3 atmospheres absolute. The hydrogenation is conveniently conducted at a temperature of from about 150–500° C. (preferably 300–400° C.) and is extended for a time sufficient to substantially reduce all the Group VIII noble metal salt to metal.

The finished catalyst obtained by using the above described steps preferably possesses a particle size of pellet size in the range of from about 4 to about 10 U.S. mesh. Also particle sizes adapted to fluid bed use may be prepared. The density of the pellets ranges from about 1.1 g./cc. to about 1.3 g./cc.

The present catalyst composition when placed in reactive contact with a gaseous stream of ethylene, oxygen and acetic acid maintained at a temperature of 90 to about 200° C. will produce substantial yields of vinyl acetate. Preferably the mixed vapors of ethylene, oxygen and acetic acid contain mole ratios of ethylene to acid ranging from about 10:1 to about 10:1 and preferably about 1:1. The amount of oxygen included in the reaction mixture ranges from about 0.5 to 20 mole percent of the total gas mixture, and preferably from about 8 to 12 mole percent. As states supra, it is also contemplated that diluent gases such as nitrogen, helium, carbon dioxide, steam and the like can be advantageously added to the system.

Excellent results have also been obtained by calcining the titanium dioxide to form pellets and then impregnating the calcined pellets with an aqueous-methanolic solution of a Group VIII metal salt. Where using this embodiment of the invention, the impregnated pellets are dried at a temperature of ca. −60 to +140° C. (using freezing-drying at temperatures below about 0° C.) and the thus dried pellets are subjected to hydrogen reduction using a pressure of hydrogen varying from about 300 mm. of mercury absolute to about 3 atmospheres gauge. Hydrogenation (reduction) of the salt is conducted at a temperature of from about 150–500° C. and is extended for a time sufficient to reduce all the Group VIII noble metal salt to metal.

The thus treated pellets are reacted with an aqueous solution of a basic material, said solution being added at a rate to provide from about 0.001 to about 0.3 mole of basic material per mole of titanium dioxide (or per mole of titanium dioxide-alumina) used. The basic material treatment is conducted at a temperature of from about 15–50° C. and is complete in a period of from about 2–18 hours.

The term "basic material" as used herein means a material selected from the group consisting of alkali metal hydroxides, alkali metal oxides, alkali metal alkoxides, and alkali metal salts of fatty acids having from one to six carbon atoms.

The binder used in forming titanium dioxide pellets is Sterotex, a product of Capitol City Product Co. Sterotex is a hydrogenated vegetable oil product used as a solid lubricant for forming pellets on a pilling machine.

Having described the basic aspects of the present invention the following nonlimiting examples are given to illustrate specific embodiments thereof.

EXAMPLE I

Pulverized titanium dioxide (97% Anatase, 3% Rutile) was soaked in excess 10% sodium hydroxide solution at room temperature for about 18 hours, filtered, washed thoroughly with water and dried in the vacuum oven at 110° C. The treated powder was mixed with 3% by weight of Sterotex binder and compressed to 1/8" x 1/8" pellets. The binder was removed by calcining the pellets at 500° C. for one hour. Analysis of the base treated and washed titania gave a value of 0.05 weight percent sodium.

A solution containing 15 g. of palladium nitrate in 34 ml. of a mixture of 55% by volume methyl alcohol and 45% by volume water was stirred with 144 g. of the pelleted titania described above. The impregnated pellets were allowed to dry in the air for about 18 hours and then heated in a vacuum oven at 110° C. for 2 hours. The deposited palladium nitrate was reduced to the metal by passing hydrogen over the dried pellets for 6 hours at 150–175° C. The resulting catalyst was recovered and analyzed. It was found to contain 3.8% palladium.

A vertically arranged stainless steel tube having an internal diameter (I.D.) of 1.8 cm. and a length of 46 cm. was charged with 63.4 g. (apparent volume 50 cc.) of the above catalyst. The catalyst was centered in the tube by placing 25 cc. of fused alumina spheres in the lower end of the tube. The tube was heated with an external heater and the temperature of the catalyst was determined by a thermocouple centered in the catalyst bed.

A gaseous mixture containing ethylene, acetic acid and oxygen in a molar ratio of 50:40:10 was passed through the catalyst bed maintained at 110° C. and a pressure of one atmosphere absolute at a gaseous hour space velocity (GHSV) of 400 liters (measured at 25° C. and one atmosphere absolute) per liter of catalyst per hour. The ethylene consumed was 24% of that charged, and the vinyl acetate selectivity based on ethylene consumed was 84%. No acetaldehyde was produced. The space time yield (STY) of vinyl acetate was 1.67 moles per liter of catalyst per hour. The activity of the catalyst did not decline after it had been used for 175 hours.

EXAMPLE II

In a comparative experiment, a catalyst was prepared according to the general method given in Example I; however, the titanium dioxide was used without treating it with a basic material. This catalyst was analyzed and was found to contain 0.05% sodium. When the gaseous mixture containing ethylene, acetic acid, and oxygen was passed over this catalyst under the conditions described, the ethylene conversion was only 1.4%. The STY of vinyl acetate with this catalyst was only 0.1 mole/liter of catalyst/hr.

EXAMPLE III

In a comparative experiment, a base-activated palladium on alumina catalyst was prepared as described in French Pat. 1,407,526. In this instance, the base (sodium acetate) was retained on the catalyst. A solution containing 15 g. of palladium nitrate in a mixture of 23.5 ml. of water and 0.5 ml. of 10% nitric acid was stirred with 69 g. of a low surface pelleted alumina (Carborundum Corporation No. SAHT–99, 3/16" x 3/16" tablets). The coated alumina was dried and the palladium salt was reduced to the metal with hydrogen at 150° C. for 6 hours. The pellets were then treated with a solution containing 20.4 g. of sodium acetate in 21.8 ml. of water and again dried.

A stainless steel tube was charged with 45.5 g. (apparent volume 50 cc.) of this catalyst and the catalyst bed was heated to 100° C. A gaseous mixture consisting essentially of ethylene, acetic acid and oxygen in a molar ratio of 50:40:10 was passed through the catalyst bed at a GHSV of 400. The initial rate of formation of vinyl acetate (STY) was 0.9 mole/liter of catalyst/hr. This dropped to a value of 0.5 after passing the gaseous mixture over the catalyst 3 hours at 100° C. During this period the selectivity (yield) for vinyl acetate dropped from 93% to 50%.

EXAMPLE IV

Pulverized titanium dioxide was mixed with 3% by weight of Sterotex binder and compressed to 1/8" x 1/8" pellets. The binder was removed by calcining the pellets at 500° C. for one hour.

A solution containing 15 g. of palladium nitrate in 34 ml. of 55% methyl alcohol was stirred with 144 g. of the pelletized titanium dioxide described above. The impregnated pellets were allowed to dry in the air for about 18 hours and then heated in a vacuum oven at 110° C. for 2 hours. The deposited palladium nitrate was reduced to metallic palladium with hydrogen. A stream of a mixture of hydrogen and nitrogen (ca. 50 mole percent hydrogen) was passed over the palladium nitrate impregnated titanium dioxide for a period of about 1/2 hour while maintaining the temperature of said impregnated titanium dioxide at about 300–350° C. after which period the temperature of the impregnated titanium dioxide was increased to about 350–400° C. The hydrogen-nitrogen stream was then replaced with a stream of substantially pure hydrogen, and said substantially pure hydrogen was passed over the impregnated titanium dioxide for about 1/2 hour.

The thus treated pellets were soaked in excess 10% potassium hydroxide solution at room temperature for about 18 hours separated from the potassium hydroxide solution by filtration. The separated pellets were washed with deionized water until the wash water leaving the filter was substantially free of potassium hydroxide. The washed pellets were dried in a vacuum oven at about 110° C. at a pressure of about 20–30 mm. of mercury absolute. The resulting catalyst was recovered and analyzed. It was found to contain 3.9% palladium.

A vertically arranged stainless steel tube having an I.D. of 1.8 cm. and a length of 46 cm. was charged with 63.4 g. (apparent volume 50 cc.) of the above catalyst. The catalyst was centered in the tube by placing 25 cc. of fused alumina spheres in the lower end of the tube. The tube was heated with an external heater and the temperature of the catalyst was determined by a thermocouple centered in the catalyst bed.

A gaseous mixture containing ethylene, acetic acid, and oxygen in a molar ratio of 50:40:10 was passed through the catalyst bed maintained at 110° C. and one atmosphere absolute at a gaseous hour space velocity of 400 liters (measured at 25° C.) and one atmosphere absolute pressure per liter of catalyst per hour. The space time yield of vinyl acetate was 1.80 moles per liter of catalyst per hour. The vinyl acetate selectivity based on ethylene was 90% and the ethylene conversion was 18%.

Excellent results were obtained in a similar run using a catalyst made by the general procedure of Example IV except that the catalyst was not washed after treatment with potassium hydroxide solution.

EXAMPLE V

Another catalyst (Catalyst V) was prepared by the general procedure of Example IV; however, the procedure was modified by substituting 3.75 g. of palladium nitrate in 34 ml. of an aqueous solution of methyl alcohol (55% methyl alcohol by weight) for the 15 g. of palladium nitrate in 34 ml. of aqueous methanol used in Example IV. A gaseous mixture under a pressure of 60 pounds per square inch gauge, said gaseous mixture consisting essentially of ethylene, acetic acid, and oxygen in a molar ratio of 50:40:10 was passed through a bed of Catalyst V, said bed being maintained at 175° C., at a gaseous hour space velocity of 2000 liters of gas (measured at 25° C. and one atmosphere absolute pressure) per liter of catalyst per hour. The ethylene consumed was 15% of that charged, and the vinyl acetate selectivity based on ethylene was 90%. The space time yield of vinyl acetate was 3.5 moles per liter of catalyst per hour.

EXAMPLE VI

A catalyst (Catalyst VI) was prepared by the general procedure of Example IV; however, the procedure was modified by substituting 7.5 g. of palladium nitrate in 34 ml. of an aqueous methyl alcohol solution, said solution analyzing 55% methyl alcohol, for the 15 g. of palladium nitrate in 34 ml. of 55% methyl alcohol. The resulting catalyst was recovered and analyzed; it was found to contain 2% palladium.

Vinyl acetate was prepared by the method of Example V, except that the reaction temperature was 160° C. and the gaseous hourly space velocity was 1200 (measured at 25° C. and one atmosphere absolute pressure) using Catalyst VI. The space time yield of vinyl acetate was 3.4 moles per liter of catalyst per hour. The ethylene consumed was 13% of that charged, and the vinyl acetate selectivity based on ethylene was 85%. The activity of the catalyst did not decline after it had been used for 160 hours.

EXAMPLE VII

Catalyst VII was prepared by the method of Example VI, except that a combination of titanium dioxide and alumina was used as a support.

Vinyl acetate was prepared by the method of Example I using Catalyst VII (the aforesaid titanium dioxide-alumina supported catalyst). The space time yield of vinyl acetate was 1.2. The ethylene consumed was 12% of that charged, and the vinyl acetate selectivity based on ethylene was 94%.

EXAMPLE VIII

A catalyst was prepared by the procedure of Example IV; however, the procedure was modified by substituting a 10% solution of sodium acetate for the potassium hydroxide solution. The sodium acetate was allowed to remain on the catalyst (i.e., the catalyst was not washed after treating with the sodium acetate solution) to form a catalyst containing 7.3% sodium acetate.

Vinyl acetate was prepared by the method of Example I using the sodium and acetate-treated catalyst. The space time yield of vinyl acetate was 1.0. The ethylene consumed was 12% of that charged, and the vinyl acetate selectivity based on ethylene was 95%.

EXAMPLE IX

A catalyst was prepared according to the process in Example I.

A gaseous mixture containing ethylene, acetic acid, and oxygen in a molar ratio of 50:40:10 was passed through the catalyst bed maintained at a temperature of 110° C. and a pressure of 1 atmosphere. At the beginning of the run the catalyst gave a space time yield of vinyl acetate of 1.8 moles per liter of catalyst per hour, which STY was constant for 96 hours. After that time the STY dropped to an average value of 1.4 and remained at this value for 428 hours.

The conversion of ethylene was about 14% of that charged, and the selectivity for vinyl acetate was 90%.

EXAMPLE X

Catalyst X was prepared by the general procedure of Example I; however, the procedure was modified by substituting 20 g. of osmium nitrate in 35 ml. of 55% methyl alcohol for 15 g. of palladium nitrate in 34 ml. of 55% methyl alcohol. Results similar to those of Example I were obtained with Catalyst X.

EXAMPLE XI

Pulverized titanium dioxide was soaked in about 3 times its volume of a 10% sodium hydroxide solution at 30–40° C. for about 18 hours, filtered, washed thoroughly with deionized water and dried in a vacuum oven at 110° C. under a pressure of about 25–30 mm. of mercury absolute. The treated powder was mixed with 3% by weight of Sterotex (a hydrogenated vegetable oil product used as an aid in forming catalyst pellets on the pelleting machine. Sterotex is available from Capitol City Product Co., Columbus, Ohio) and compressed to 3/16" x 3/16" pellets on a pelleting machine. The Sterotex was removed after pellets were formed by calcining the catalyst at about 500° C. for one hour.

A solution containing 15 g. of palladium nitrate in 34 ml. of 55% methyl alcohol was stirred with 144 g. of the titanium dioxide pellets described above. The impregnated pellets were allowed to dry in the air for about 18 hours and then heated in a vacuum oven at 110° C. for about 2 hours under a pressure of about 25–30 mm. of mercury absolute. The deposited palladium nitrate was reduced to metallic palladium by passing gaseous hydrogen over the pellets for 2 hours at 175–200° C. The resulting catalyst contained about 4% metallic palladium.

A vertically arranged stainless steel reactor having an I.D. of 1.8 cm. and a length of 46 cm. was charged with 63.4 of (apparent volume 55 cc.) the above catalyst. The catalyst bed was centered vertically in the reactor by placing it over fused alumina spheres which were placed in the lower section of reactor. The reactor was heated with an external electric heater and the temperature of the catalyst bed was determined by a thermocouple inserted in the catalyst bed.

A gaseous mixture consisting essentially 34 mole-percent ethylene, 6.5 mole-percent oxygen, 14 mole-percent acetic acid and 45.5 mole-percent steam was passed through the catalyst bed at 95° C. at a gaseous hourly space velocity of 491 liter of gas per liter of catalyst per hour (gas measured at 25° C. and 1 atmosphere absolute). Analysis of the reactor gases by gas chromatography indicated that vinyl acetate was being produced at a rate of 0.2 mole/liter of catalyst/hour. Ethylene conversion was about 15%. Gas chromatography showed no detectable amounts of acetaldehyde.

The above examples clearly indicate that the present novel catalyst composition will continuously and efficiently produce vinyl acetate.

Vinyl acetate is a well known article of commerce. It is polymerized to form polyvinyl acetate which finds use in latex paints, reinforcement for paper tape (e.g., masking tape), and as a component of sealing compounds (e.g., compositions used to seal lids on metallic cans).

We claim:
1. A method for preparing vinyl acetate, said method comprising:
  (a) passing a gaseous feed stuff mixture of oxygen, ethylene, and acetic acid over a catalyst in a reaction zone at a temperature of about 90–200° C. and at a pressure of about 0–150 pounds per square inch gauge; said catalyst consisting of a titanium dioxide support which has been contacted with a basic material selected from the group consisting of alkali metal hydroxides, alkali metal alkoxides, alkali metal oxides, and alkali metal salts of carboxylic acids having from one to six carbon atoms, washed substantially free of said basic material and calcined at about 300–500° for at least one hour and palladium metal deposited on said support by impregnating said support with a palladium salt and reducing the palladium salt to metallic palladium with hydrogen;

(b) removing a reaction mixture, said reaction mixture consisting essentially of reaction product and unreacted gaseous feed stuff from the reaction zone; and (c) recovering vinyl acetate from the reaction mixture exit the reaction zone.

2. The method of claim 1 wherein the mole ratio of ethylene to acetic acid in the gaseous feedstuff mixture is about 10:1 to about 1:10, and oxygen is present in said feedstuff mixture in amounts ranging from about 0.5 to 20% by volume of the total gaseous feedstuff mixture.

3. The process of claim 1 wherein the gaseous feedstuff mixture is passed over the catalyst at a rate to provide about 400–2000 liters of gaseous mixture per liter of catalyst per hour.

4. The process of claim 1 wherein the reaction mixture is recycled to the reaction zone after recovering vinyl acetate from the reaction mixture.

References Cited

UNITED STATES PATENTS 3,190,912  6/1965  Robinson _____ 260—497

LORRAINE A. WEINBERGER, Primary Examiner

V. GARNER, Assistant Examiner

U.S. Cl. X.R.

52—430, 466; 252—472, 474